United States Patent Office 3,466,288
Patented Sept. 9, 1969

3,466,288
9,4α-IMINOETHANOANTHRACENES AND INDENO
[2,1-j]ISOQUINOLINES
Holger V. Hansen, Morris Plains, Sylvester Klutchko,
Hackettstown, and Robert Israel Meltzer, Rockaway,
N.J., assignors to Warner-Lambert Pharmaceutical
Company, Morris Plains, N.J., a corporation of
Delaware
No Drawing. Filed Sept. 9, 1966, Ser. No. 578,149
Int. Cl. C07d 29/20
U.S. Cl. 260—286                                    8 Claims

ABSTRACT OF THE DISCLOSURE

Tetracyclic 9,4a-iminoethanoanthracene of the formula:

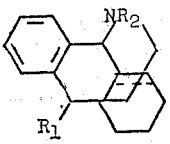

I wherein $R_1$ is carbonyl oxygen or hydroxyl; and $R_2$ is lower alkyl.

These compounds are useful as antiinflammatory agents.

This invention relates to a composition of matter and relates more particularly to tetracyclic 9,4a-iminoethano-anthracene of the formula

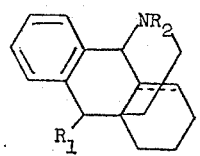

I wherein $R_1$ is a carbonyl oxygen or hydroxyl; $R_2$ is lower alkyl of 1 to 6 carbon atoms and which may or may not contain an isolated double bond between the positions indicated by the dotted lines in the above formula.

In the preparation of the above compound certain novel byproducts having an isoquinoline nucleus are also obtained. These novel isoquinoline derivatives may be represented by the formula:

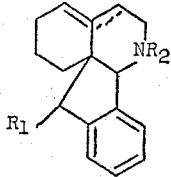

II or the indicated double-bond isomer thereof and these compounds are also included within the scope of this invention.

In Compound II above $R_1$ and $R_2$ have the same meaning as previously defined. The compounds of this invention form acid addition salts with pharmaceutically acceptable acids and these acid addition salts as well as pharmaceutical dosage forms containing the subject compounds or their acid addition salts as active ingredients are also included within the scope of this invention.

The novel compounds of this invention are useful as analgesic and antiinflammatory agents.

In order to use these compounds they may be administered orally or parenterally at a dosage of about 1 to 100 mg. several times daily. The compounds of this invention may also be combined with other therapeutic agents such as steroids, for example, cortisone, prednisolone, tranquilizers such as chlordiazepoxide, cyprazapram, diazepam, antacids such as magnesium trisilicate, magnesium hydroxide and the like to enhance and broaden their therapeutic spectrum.

According to the process of this invention, the above compounds are produced by treating a compound of the formula:

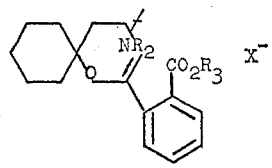

III with a complex metal hydride such as sodium or potassium borohydride to yield an intermediate having the formula:

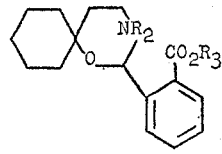

IV

In the above $R_2$ and $R_3$ each represents lower alkyl and X is an anion such as a halide, a sulphate and the like.

The preparation of this starting Compound III is fully described in our copending application 2-aryl-1-oxa-3-azaspiro[5,5]undec-2-enes, U.S. Ser. No. 572,884 filed Aug. 17, 1966, now U.S. Patent No. 3,395,145, issued July 30, 1968.

Compound IV is then treated with an acidic condensing agent such as hydrogen bromide in acetic acid and subsequently with aqueous hydrobromic acid to yield the intermediate isoquinoline lactone of the formula:

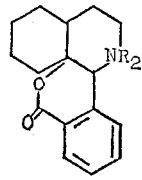

V

Compound V is then treated with an acidic dehydrating agent such as polyphosphoric acid at a temperature of about 100 to 200° C. to yield a mixture of compounds corresponding to the following formulas:

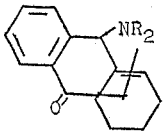        and        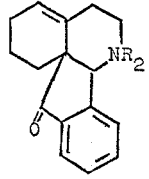

VI                                              VII

Thus compounds VI and VII may be separated by fractional crystallization techniques, e.g., by fractional crystallization of their hydrochloride salts.

Compound VI may be further reduced with a complex metal hydrodie such as sodium or potassium borohydride to yield those compounds of this invention wherein $R_1$ is hydroxy of the formula:

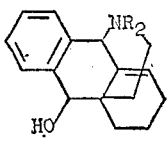

VIII

Compound VIII may be further reduced with gaseous hydrogen in the presence of a suitable hydrogenation catalyst to yield a compound of the formula:

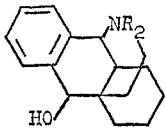

IX

This reduction is carried out in neutral solutions. In contrast when Compound VIII is subjected to hydrogenation under acidic conditions, the ring opens to yield angularly substituted octahydroanthracene derivatives having the formula:

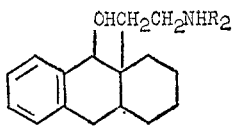

X

Compound VII, on the other hand, on reduction with a complex metal hydride furnishes the corresponding alcohol having the formula:

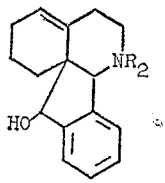

XI

The compounds of this invention form salts with acids. Such salts are readily prepared by the usual methods, such as, for example, the reaction of a stoichiometrically equivalent amount of the base and the desired acid in an inert common solvent. Examples of acids which are suitable for the preparation of acid addition salts of the amine base of this invention are inorganic acids, such as, for example, hydrochloric, nitric, sulfuric, phosphoric, and the like acids, and organic acids, such as, for example, benzoic, acetic, salicyclic, maleic, tartaric, citric and the like acids. The preferred salts are those which are pharmaceutically acceptable, that is, they are acid addition salts which are no more toxic than the bases from which they are prepared and which possess the necessary physical properties that render them suitable for incorportion into dosage forms in combination with the desired pharmaceutical carriers.

The following examples are included in order further to illustrate the invention. All temperatures are given in degree centigrade. Room temperature is 20 to 30° C.

EXAMPLE 1

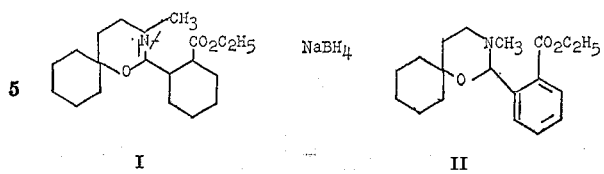

2 - (o - ethoxycarbonylphenyl) - 3-methyl-1-oxa-3-azaspiro [5,5]undecane.—To a stirred solution of 100 g. (0.226 mole) of the methiodide I in 600 ml. absolute ethanol, 17.1 g. (0.45 mole) of sodium borohydride is added gradually, keeping the temperature of the reaction below 25° by means of an ice bath. The resulting mixture is stirred for 1 hr. at room temperature, diluted with 1500 ml. of ice water and extracted with 1 l. of ether. The ether solution is washed with water, dried (potassium carbonate) and evaporated, leaving 71 g. (99%) of the reduced oxazine II as a viscous colorless oil. A 12 g. sample of this oil is distilled, giving an analytically pure center fraction with B.P. 136–4°/0.07 s.m. and $n^{24}_D$ 1.5233;

$\lambda^{EtOH}_{max.}$ m$\mu$ ($\epsilon$) 221–5 (6840) and 272 (910); $\nu_{film}$ 1725 (C=O) cm.$^{-1}$ Analysis.—Calcd. for $C_{19}H_{27}NO_3$: C, 71.89; H, 8.57; N, 4.41. Found: C, 72.01; H, 8.73; N, 4.37.

EXAMPLE 2

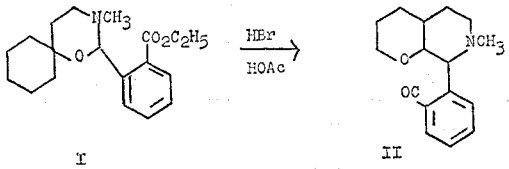

2 - (decahydro - 8a - hydroxy - 2 - methyl - 1 - isoquinolyl)-benzoic acid δ-lactone.—To 500 ml. of acetic acid, saturated with hydrogen bromide at room temperature, is added 59 g. (0.186 mole) of the crude reduced oxazine (I). The mixture is refluxed for 3 hrs., cooled and evaporated under reduced pressure. The residue is dissolved directly in 200 ml. of 48% hydrobromic acid and heated on the steam bath for 3 hrs., then allowed to stand overnight at room temperature. The mixture is evaporated to near dryness and the residue, after dilution with 800 ml. of water, is extracted with ether to remove non-basic impurities. The aqueous acid solution is treated with charcoal and made basic with excess potassium carbonate. The separated, semisolid lactone is extracted into 1200 ml. of ether and the ether solution, after drying (potassium carbonate) is evaporated, leaving 34 g. of the crude lactone (II). This crude product is dissolved in 500 ml. of hot Skellysolve C, decanted from tarry byproducts; on cooling the solution deposits 22 g. (43%) of the lactone (II), M.P. 122–3°. An analytical sample, which is prepared by further recrystallization from the same solvent, has M.P. 122–4°; $\lambda_{max}$ m$\mu$ ($\epsilon$) 233 (4410), 278 (710) and 285 sh. (650); $\nu_{Nujol}$ 1730 cm.$^{-1}$.

Analysis.—Calcd. for $C_{17}H_{21}NO_2$: C, 75.24; H, 7.80; N, 5.16. Found: C, 75.20; H, 7.72; N, 5.16.

EXAMPLE 3

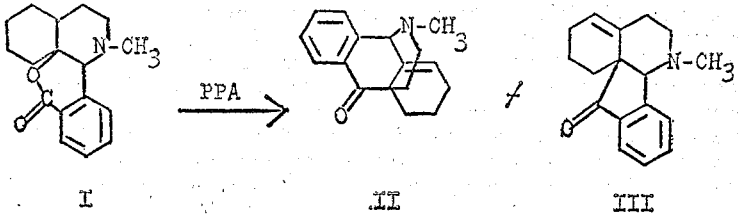

2,3,4,9 - tetrahydro - 13 - methyl - 10H - 9,4a - iminoethanoanthracen-10-one hydrochloride and 1,2,3,4, (or 5,) 6,7,7a,12 - octahydro - 7 - methylindeno[2,1-j]isoquinolin-12-one hydrochloride (III).—A mixture of 65 g. (0.24 mole) of the lactone I and 600 g. of polyphosphoric acid is heated wtih stirring at 155–160° C. for one-half an hour. The dark solution is poured into about 1500 ml. of ice water. The dark solution is charcoaled and filtered. The yellow filtrate is made alkaline with 10 M KOH while preventing the temperature from rising above 30° by efficient cooling. The separated oil is extracted into 1500 ml. of ether, is dried (potassium carbonate) and evaporated leaving 53 g. (87%) of the viscous mixed ketones II and III.

Separation of isomers

The infrared of the mixed ketones shows two carbonyl bands, a 1728 cm.$^{-1}$ attributed to III and a split 1680 and 1695 cm.$^{-1}$ absorption attributed to structure II.

A solution of 10.0 grams of the above prepared mixed ketones in 150 ml. of 2-propanol is treated with excess hydrogen chloride gas. Addition of 50 ml. of ether gives crystalline crop No. 1, weight 0.8 gram, melting point 254–256° C. Upon addition of 800 ml. of ether to the filtrate another 0.7 g. of crystals (crop No. 2) with M.P. 254–256° are obtained. These two crops are essentially the same material is indicated by infrared. The filtrate is concentrated to about 50–70 ml. volume. A quantity of 600 ml. of ether is added to precipitate a viscous amorphous material (crop No. 3) which is probably a mixture of II and III hydrochloride as shown by both carbonyls in the infrared. The clear supernatent is decanted from crop No. 3 and seeded with some II·HCl from a test preparation. Crop No. 4 gradually separates as white crystals melting at 229–231° C. Wt. 3.1 g. Crop No. 1 shows only the 1710 cm.$^{-1}$ band in the carbonyl region and crop No. 4 shows only a split 1680–1695 cm.$^{-1}$ band indicating that crop No. 1 has structure III·HCl, and crop No. 4 has structure II·HCl.

Recrystallization of crop No. 1 from absolute ethanol-ether affords pure III·HCl with melting point 257–259° C.;

$\lambda_{max.}^{EtOH}$ m$\mu$ ($\epsilon$) 246 (6520), 280 (723); $\nu_{Nujol}$ 1728 (C=O) cm.$^{-1}$ Analysis.—Calcd. for $C_{17}H_{19}NO \cdot HCl$: C, 70.46; H, 6.96; N, 4.83. Found: C, 70.54; H, 7.11; N, 4.89.

Recrystallization of crop No. 4 from 2-propanol-ether affords pure II·HCl melting at 231–233° C.;

$\lambda_{mat}^{EtOH}$ m$\mu$ ($\epsilon$) 244 (4900), 285 (673); $\nu_{Nujol}$ 1680–1695 (C=O) cm.$^{-1}$ 3,4,9,10 - tetrahydro - 13 - methyl - 2H - 9,4a - iminoethanoanthracen-10-ol (III) and 1,2,3,4, (or 5,) 6,7,7a,12-octahydro - 7 - methylindeno - [2,1 - j]isoquinolin - 12 - ol hydrochloride (IV).—To a solution of 41.7 g. (0.165 mole) of the mixed ketones (I and II) in 400 ml. of absolute ethanol there is added 7.6 g. (0.2 mole) of sodium borohydride. After fifteen minutes at room temperature, the mixture is heated on the steam bath for one hour. To the cooled solution is added one liter of ice water and the resulting mixture is extracted with 600 ml. of methylene chloride. This solution is dried over potassium carbonate, filtered and evaporated to give 40 g. of crude, partly crystalline mixed alcohols. Ethyl acetate (175 ml.) is added and the mixture is heated to the boiling point. The large colorless crystals which separate on cooling weigh 14.9 g., M.P. 169–171°. Another 9.0 g. of a second crop is obtained by concentrating to dryness, triturating with 150 ml. of 50% ether-petroleum ether and filtering, M.P. 165–167° C., total weight, 23.9 g. (56.8%) of Compound III. Two recrystallization of crop No. 1 from ethylacetate petroleum ether affords analytically pure III with M.P. 170–172° C.;

$\lambda_{max.}^{EtOH}$ m$\mu$ ($\epsilon$) 260 sh. (470), 267 (570), 274 (500); $\nu_{Nujol}$ 3100 (—OH) cm.$^{-1}$ Analysis.—Calcd. for $C_{17}H_{21}NO$: C, 79.96; H, 8.29; N, 5.49. Found: C, 80.24; H, 8.25; N, 5.76.

Isolation of isomer IV

The above ether-petroleum ether filtrate, from which crop No. 2 of crude III is obtained, is concentrated to dryness. The residue is triturated with 200 ml. of petroleum ether. A quantity of about 3 g. of crude material (II) remains out of solution. The decanted petroleum ether solution is evaporated to give about 10 g. of a viscous oil. The infrared spectrum on this material shows some 1728 cm.$^{-1}$ band present, indicating some unreduced II. This material is re-reduced by refluxing in a solution of absolute ethanol (150 ml.) with 5.0 g. of $NaBH_4$ for one hour.

Water (200 ml.) is added and the separated product is extracted into ether (200 ml.), dried (potassium carbonate) and filtered. The infra red shows the 1728 cm.$^{-1}$ band to be gone. The hydrochloride salt is prepared by treating the ether solution with hydrogen chloride gas. Several recrystallizations from 2-propanol-ether give pure IV hydrochloride, M.P. 241–243° C.; $\nu_{Nujol}$ 3250 (OH) cm.$^{-1}$.

Analysis.—Calcd. for $C_{17}H_{21}NO \cdot HCl$: C, 69.97; H, 7.60; N, 4.80. Found: C, 70.02; H, 7.85; N, 4.99.

Both of these alcohols (III and IV) are also prepared separately on a small scale from the corresponding authentic ketones I and II.

EXAMPLE 5

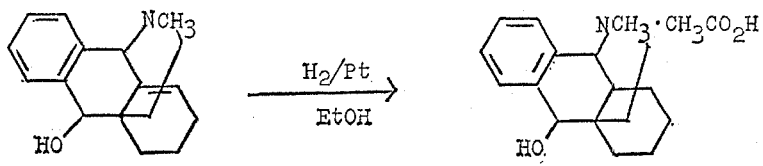

I  II

Analysis.—Calcd. for $C_{17}H_{19}NO \cdot HCl$: C, 70.46; H, 6.96; N, 4.83. Found: C, 70.71; H, 7.17; N. 4.54.

EXAMPLE 4

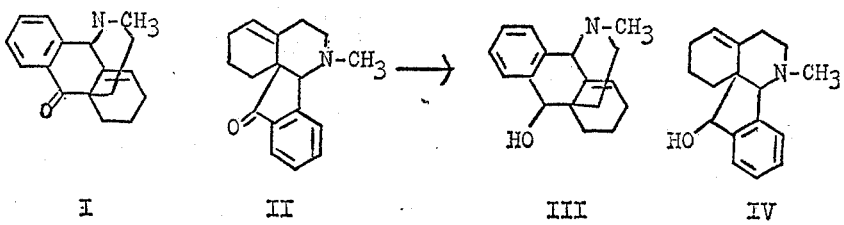

I  II  III  IV 1,3,4,9,9a,10 - hexahydro - 13 - methyl - 2H - 9,4a-iminoethanoanthracene-10-ol monoacetate salt.—A solution of 8 g. (0.031 mole) of the 13-methyl-tetrahydro-2H-9,4a-iminoethanoanthracene (I) in 150 ml. of absolute ethanol is hydrogenated in a Parr apparatus at room temperature over 0.2 g. of platinum oxide. After 2½ hrs., hydrogen uptake ceases. The mixture is filtered and the alcohol is evaporated under reduced pressure. The residue is dissolved in 200 ml. of ether and treated with 4.8 g. of glacial acetic acid. The resulting precipitate is filtered to give 7.3 g. (77%) of the pure acetate salt of the amino alcohol (II), M.P. 148–9°. For analysis, a small sample is recrystallized twice from ethyl acetate to give material of M.P. 148–9°;

$\lambda_{max.}^{EtOH}$ m$\mu$ ($\epsilon$) 219 sh. (10,500), 262 (328, 268 (280) and) 273 (264); $\nu_{Nujol}$ 3200 (OH), 1600 (broad, $-CO_2^-$) cm.$^{-1}$ Analysis.—Calcd. for $C_{17}H_{23}NO \cdot CH_3CO_2H$: C, 71.89; H, 8.57; N, 4.41. Found: C, 72.11; H, 8.74; N, 4.21.

EXAMPLE 6

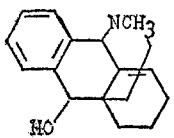 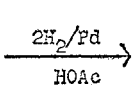 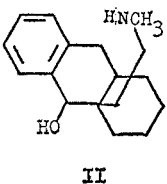

I                II 1,2,3,4,4a,9,9a,10 - octahydro - 9a - [2 - (methylamino) ethyl]anthracen-9-ol.—A solution of 7.3 g. (0.029 mole) of the olefinic amino alcohol (I) in 150 ml. of glacial acetic acid is hydrogenated in a Parr apparaus at room temperature over 0.2 g. of 10% palladium-on-charcoal. After 4 hrs., the absorption of hydrogen is completed. The mixture is filtered and evaporated and the residue, after dilution with 150 ml. of water, is made strongly basic with alkali and extracted with 300 ml. of ether. The ether solution is dried (potassium carbonate) and evaporated, leaving the product (II) as an oil which slowly crystallizes, M.P. 102–5°. Recrystallization from Skellysolve B then furnishes 4.9 g. (66%) of the pure tricyclic amino alcohol II, M.P. 107–9°. A second recrystallization from Skellysolve B gives an analytical sample of II, M.P. 107–9°;

$\lambda_{max.}^{EtOH}$ m$\mu$ ($\epsilon$) 259 sh. (490), 266 (380) and 273 (368); $\nu_{Nujol}$ 3280 (OH), 2800 (NH) cm.$^{-1}$ Analysis.—Calcd. for $C_{17}H_{25}NO$: C, 78.71; H, 9.72; N, 5.40. Found C, 79.00; H, 9.92; N, 5.26.

Having described our invention, what we desire to secure by Letters Patent is:

1. A compund of the formula:

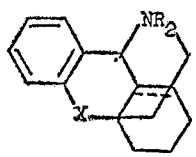

wherein X is

or

and $R_2$ is lower alkyl and the nontoxic pharmaceutically acceptable acid addition salts thereof.

2. The compound of claim 1 which is 3,4,9,10-tetrahydro-13-methyl-2H-9,4a - iminoethanoanthracen - 10-ol and the nontoxic pharmaceutically acceptable acid addition salts thereof.

3. The compound of claim 1 which is 2,3,4,9-tetrahydro-13-methyl-10H-9,4a - iminoethanoanthracen - 10-one hydrochloride and the nontoxic pharmaceutically acceptable acid addition salts thereof.

4. The compound of claim 1 which is 1,3,4,9a,10-hexahydro-13-methyl-2H-9,4a - iminoethanoanthracen - 10-ol and the nontoxic pharmaceutically acceptable acid addition salts thereof.

5. 1,2,3,4,4a,9,9a,10 - octahydro - 9a - [2-(methylamino)ethyl]anthracen-9-ol.

6. A compound of the formula:

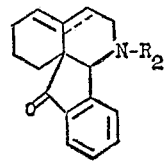

wherein $R_2$ is lower alkyl.

7. A compound of the formula:

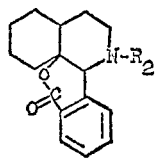

wherein $R_2$ is lower alkyl.

8. A compound of the formula:

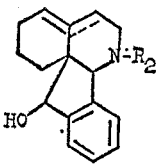

wherein $R_2$ is lower alkyl.

References Cited

UNITED STATES PATENTS 2,769,810  11/1956  Ocitiri et al. _____ 260—285

OTHER REFERENCES

Hallum: Dissertation, Abstracted in Chem. Abstracts, vol. 47, col. 805a (1953).

Bentley: "The Chemistry of Morphine Alkaloids," Oxford, 1954, pp. 113 and 403 relied on.

DONALD G. DAUS, Primary Examiner

U.S. Cl. X.R.

260—244, 286, 287, 289, 570.8, 690, 999